United States Patent
Gold et al.

(10) Patent No.: US 10,380,410 B2
(45) Date of Patent: Aug. 13, 2019

(54) APPARATUS AND METHOD FOR IMAGE-BASED POSITIONING, ORIENTATION AND SITUATIONAL AWARENESS

(71) Applicant: Eyeways Systems LTD., Ramat Hasharon (IL)

(72) Inventors: Yaron I. Gold, Zikron Yaakov (IL); Benjamin Karov, Ramat Hasharon (IL)

(*) Notice: Subject to any disclaimer, the term of this patent is extended or adjusted under 35 U.S.C. 154(b) by 236 days.

(21) Appl. No.: 15/300,305

(22) PCT Filed: Mar. 29, 2015

(86) PCT No.: PCT/IB2015/052312
§ 371 (c)(1),
(2) Date: Sep. 29, 2016

(87) PCT Pub. No.: WO2015/155628
PCT Pub. Date: Oct. 15, 2015

(65) Prior Publication Data
US 2017/0185823 A1    Jun. 29, 2017

Related U.S. Application Data

(60) Provisional application No. 61/975,929, filed on Apr. 7, 2014.

(51) Int. Cl.
*G06K 9/00* (2006.01)
*G06F 16/51* (2019.01)
(Continued)

(52) U.S. Cl.
CPC ....... *G06K 9/00214* (2013.01); *G01C 21/206* (2013.01); *G06F 16/51* (2019.01);
(Continued)

(58) Field of Classification Search
CPC .......... G06K 9/00214; G06K 9/00671; G06K 9/4671; G06F 16/5838; G06F 16/51; G06T 19/006; G01C 21/206
See application file for complete search history.

(56) References Cited

U.S. PATENT DOCUMENTS 9,418,482 B1 * 8/2016 Yang ................. G06F 17/30265
2004/0199531 A1 10/2004 Kim et al.
(Continued)

FOREIGN PATENT DOCUMENTS

WO       2013029674       3/2013

OTHER PUBLICATIONS

Wang et al., "Camera pose estimation based on angle contraints", Advances in Visual Computing, pp. 96-107, Springer Berlin Heidelberg, Dec. 31, 2010.
(Continued)

*Primary Examiner* — Qian Yang
(74) *Attorney, Agent, or Firm* — Manelli Selter PLLC; Edward Stemberger

(57) ABSTRACT

The present invention comprises computation of 3D real-world positions of points and objects in a scene. It further comprises computation and sharing of positions and orientations of digital imaging means generating images of a scene. The invention further comprises using a camera of an electronic mobile device, and providing users of said mobile device with information regarding navigation, and other position-based information, based on images taken by said device. The invention further comprises: accessing a database configured to store a plurality of feature-objects, each feature-object comprising: at least one set of feature-object-descriptors, and at least one feature-point, each one of said at least one feature point comprising at least: spatial coordinates of a 3D real-world point; and at least one point-
(Continued)

descriptor-set; a Data-acquisition module configured to generate said plurality of feature-objects and insert them into said database; a Query-generation-and-search module configured to generate or receive as input at least one query-feature-object and provide at least one feature-object that matches said at least one query-feature object; and a Database-update module configured to generate new feature-objects in said database.

17 Claims, 13 Drawing Sheets

(51) Int. Cl.
    *G06F 16/583*     (2019.01)
    *G06K 9/46*     (2006.01)
    *G01C 21/20*     (2006.01)
    *G06T 19/00*     (2011.01)

(52) U.S. Cl.
    CPC ..... *G06F 16/5838* (2019.01); *G06K 9/00671* (2013.01); *G06K 9/4671* (2013.01); *G06T 19/006* (2013.01)

(56) References Cited

U.S. PATENT DOCUMENTS

| | | |
|---|---|---|
| 2011/0211760 A1 | 9/2011 | Boncyk et al. |
| 2011/0282578 A1 | 11/2011 | Miksa et al. |
| 2012/0062702 A1 | 3/2012 | Jiang et al. |
| 2012/0121192 A1 | 5/2012 | Kim et al. |
| 2013/0124508 A1 | 5/2013 | Paris et al. |
| 2013/0223749 A1 | 8/2013 | Na et al. |
| 2013/0243250 A1* | 9/2013 | France ............... G01C 15/00 382/103 |
| 2013/0335529 A1 | 12/2013 | Engedal |
| 2014/0363048 A1* | 12/2014 | Vrcelj ............... G06K 9/78 382/103 |
| 2015/0084951 A1* | 3/2015 | Boivin ............... H04N 5/272 345/419 |
| 2018/0247429 A1* | 8/2018 | Chandraker ....... G06T 7/74 |

OTHER PUBLICATIONS

Lee et al., "Invariant Feature Extraction Using 3D Silhouette Modeling", Proceedings of the International Conference on Image Processing, Computer Vision, and Pattern Recognition (IPCV), p. 1, The Steering Committee of the The World Congress in Computer Science, Computer Engineering and Applied Computing (WorldComp), Retrieved from the Internet on Aug. 25, 2015 <http://worldcomp-proceedings.com/proc/p2014/IPC3229.pdf>, Jan. 31, 2014.

International Search Report in PCT/IB2015/052312 dated Aug. 30, 2015.

Internationals Preliminary Report on Patentability in PCT/IB2015/052312 dated Apr. 11, 2016.

\* cited by examiner

APPARATUS AND METHOD FOR IMAGE-BASED POSITIONING, ORIENTATION AND SITUATIONAL AWARENESS

CROSS-REFERENCE TO RELATED PATENT APPLICATIONS

This patent application claims priority from and is related to U.S. Provisional Patent Application Ser. No. 61/975,929, filed 7 Apr. 2014, this U.S. Provisional Patent Application incorporated by reference in its entirety herein.

TECHNOLOGY FIELD

The invention relates to the field of positioning, orientation and situational awareness, in particular by means of imaging, in particular by means of mobile device cameras, in particular in environments with inadequate satellite signal quality, and in particular in indoor venues. The invention further relates to the fields of 3D surveying, and of visual contents databases.

BACKGROUND

Navigation using a personal mobile device (such as a "smart" cell-phone) is commonplace, and mostly makes use of satellite based global positioning systems (e.g. GPS).

While navigation (i.e., finding one's way from the current position to a desired destination) was the "raison d'etre" for positioning technology, the capability of determining and sharing the positions of object, and in particular one's self-position spawned a myriad of other applications and services, such as Surveying and Mapping, Location Based Services (LBS) and advertisement, Social Network applications, people and vehicle tracking, etc. All this has made positioning technology very popular, and it is installed in all modern mobile devices.

Satellite GPS technology is very attractive because the vast majority of GPS receivers are relatively simple and low cost, and the required satellite signal is globally available, without the need for any additional hardware or infrastructure installation. However—it becomes useless in areas where the receivers cannot "see the sky", or are otherwise deprived of adequate satellite signal.

Indoor shopping malls, airport terminals, trade show and exhibition venues, museums—these are just some of the venues where position based applications can be extremely useful, but where GPS technology cannot work, and one has to look for other technologies that can do the task. Existing indoor positioning technologies are mostly based on radio signals, such as WiFi, which also happens to be available in most modern mobile devices. However, these technologies lack adequate precision, or require costly hardware infrastructure installation and maintenance throughout the area where positioning is desired.

SUMMARY

The present invention is based on computer vision and imaging technology and its purpose is to provide positioning information pertaining to points and objects appearing in an image, and to provide the position and angle-of-gaze of the camera taking the image. For example, an embodiment of the invention is intended to provide users of mobile devices with information facilitating orientation and situational awareness, especially in large or complex indoor venues.

The said embodiment comprises a system and method configured to compute and present such information, using data from the digital camera and other sensors installed in said mobile devices, along with data retrieved from a pre-compiled database of said venue.

A possible embodiment of the said apparatus and method is further configured to allow each of a multitude of mobile devices (such as "smart phones") to determine and share its precise position, including in (but not limited to) geographical areas deprived of adequate positioning satellite signal (such as GPS).

A possible embodiment of the said apparatus and method is further configured to allow each of said mobile devices to determine and share its direction of gaze (the direction in which said mobile device's camera is pointing).

A possible embodiment of the said apparatus and method is further configured to allow each of said mobile devices to determine and share the identity of its objects of gaze (objects in said camera's field of view).

A possible embodiment of the said apparatus and method is further configured to provide the users of said mobile devices with information and services that are based on said positions, directions of gaze and objects of gaze.

The invention comprises several components and modules. Some of said modules are installed on the mobile devices' processing units ("clients"), and others are implemented on at least one processing unit ("server") capable of communicating with the clients.

The invention comprises a pre-compiled database, storing a multitude of feature-objects. Each feature-object comprises at least one set of object-descriptors, and at least one feature-point. Each said feature-point comprises the coordinates of a real 3D point in the venue where positioning is required, and at least one point-descriptor-set derived from a digital image of the said 3D point. All said descriptor-sets are organized so as to facilitate retrieval of relevant feature-objects from a query-descriptor-set. Each of the said 3D points may, and generally does appear in a multitude of digital images, and may thus be associates with a multitude of descriptor-sets, or views.

In a possible embodiment of the invention, the data in said pre-compiled database are obtained by video filming the venue, using a stereoscopic video camera system. The video image-pair sequence is analyzed to obtain (1) the real 3D coordinates of a multitude of points appearing in the images of said sequence, and (2) a descriptor-set for each said point in each of the multitude of images in which said point appears. Each said 3D coordinate-set and the corresponding multitude of descriptor-sets constitute a feature-point. Feature-points may be grouped into feature-objects (e.g., based on some topological relationship between them, said relationship being incorporated into said feature-object's descriptor-set). The redundancy and overlap of points in the multitude of images in the sequence is key to this embodiment, as it (1) enables tracking the points across image-pairs for precise calculation of their real-world 3D coordinates, and (2) provides sufficient abundance of data for the positioning module described below.

An embodiment of the invention further comprises at least one digital image taken by a user's camera and possibly additional data from other sensors attached to said camera, such as accelerometers, gyros, magnetometer, etc. (for example—the camera and sensors of a mobile device), From said at least one digital image and data, a software program is configured to extract a multitude of query-feature-objects. Each of the said query-feature-objects comprising at least one set of descriptors, or query-descriptor-set. Each of said query-feature-objects further comprises at least one query-key-point. Each of the said query-key-points comprises a key-descriptor-set, and the 2D pixel location of at least one pixel in the said digital image. The said query-descriptor-sets are used to search the pre-compiled database to retrieve matching feature-objects, and the said key-descriptor-sets are used to further retrieve matching feature-points with their corresponding 3D coordinates. A possible embodiment of the invention further computes the precise 3D position of the camera (e.g., a user's mobile device). For said computation, The software further uses: (1) the 3D coordinates of the said retrieved feature-points, (2) the 2D pixel locations of the corresponding said key-points extracted from the image, and (3) the parameters of said camera (a.k.a "intrinsic parameters"). Data from other sensors are optionally used to support the computation result.

In a possible embodiment of the invention, a set of simultaneous equations is constructed from said 2D pixel locations, said corresponding 3D feature-point coordinates, and the camera projection matrix derived from said camera's intrinsic parameters. The said set of simultaneous equations is solved to obtain the mobile device's position.

In a possible embodiment of the invention, the said mobile device's position is obtained by searching the relevant 3D space for the point with minimal cumulative distances between the given 2D pixel-coordinates and the back-projected 2D pixel-coordinates of the said corresponding 3D feature-point coordinates. Said back-projection is computed using said camera projection matrix.

In a possible embodiment of the invention, a search of the said 3D space is conducted in a first 2D space (e.g., horizontal) to compute said mobile device's position in that space. A similar search in a second 2D space (e.g. vertical) may follow if a full 3D position of the mobile device is required.

In a possible embodiment of the invention, the search of the 3D or 2D space is conducted iteratively. In each iteration, the search is conducted in a neighborhood around the result of the previous iteration.

In a possible embodiment of the invention, the search of the 3D or 2D space is restricted by geometric constraints. A possible embodiment of said constraint in the 2D space is based on the intersections of a multitude of circles. Each of said circles is the geometrical locus of all points at which the angle subtended by a selected pair of feature-points is constant, and equal to the angle between the said camera's projection lines to the pixels that correspond to said feature-points.

A possible embodiment of the invention further comprises a module configured to use the images and queries from the multitude of users' mobile devices to keep the database current by continuously supplying up-to-date descriptors and 3D coordinates for existing and newly generated features-points and feature-objects.

A possible embodiment of the invention further comprises a navigation module configured to make use of the derived position and view (direction-of-gaze) information for navigation.

A possible embodiment of the invention further comprises a location based services module configured to present to the user information relevant to said user's position and view, such as sales information of close-by stores, near-by event information, advertisements, announcements, etc.

A possible embodiment of the invention further comprises a social network module configured to share derived position and view information with other authorized users. A possible embodiment of the invention further comprises a behavior analysis module configured to use derived position and view information to track and analyze user behavior. A possible embodiment of the invention further comprises a user interface configured to enable the user of said mobile device to interact with the invention software and hardware by communicating requests and intentions, and receiving desired information. An embodiment of the said user interface is further configured to superimpose graphical data on the mobile camera's image screen (a.k.a "Augmented Reality"), such as navigation arrows and instructions, information signs, advertisements, avatars of other users in the venue, etc. Said embodiment is further configured to place Augmented Reality objects on the screen using virtual markers comprising derived 3D positions of relevant objects-of-gaze.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF EMBODIMENTS

The present invention provides positioning information that can serve a myriad of applications, including, by way of example, surveying and mapping, navigation and orientation, location-based services, social interaction, and augmented reality applications. The invention is based on computer vision and imaging technology and is thus useful both outdoors and indoors, regardless of satellite positioning signal availability.

For example, a possible application of the invention may provide users of mobile devices with information facilitating orientation and situational awareness. It may be targeted for use in large or complex indoor venues. Such an application may comprise a precise, yet installation-free indoor positioning utility, configured to make use of the high quality digital camera available in practically every modern mobile device, and requires no hardware infrastructure installation or maintenance.

The invention comprises a pre-compiled database configured to facilitate retrieval of information relevant to an image of the scene. A possible method for preparing the said database comprises a one-time session of video filming of the covered venue, which is analyzed by the invention's software to create an initial database. Since usage of the utility is based on users' devices taking pictures, these pictures, from a plurality of users and a plurality of vantage points, also serve for subsequent updates of the database in order to keep it current (a strategy a.k.a. "crowd sourcing").

Figure 1:
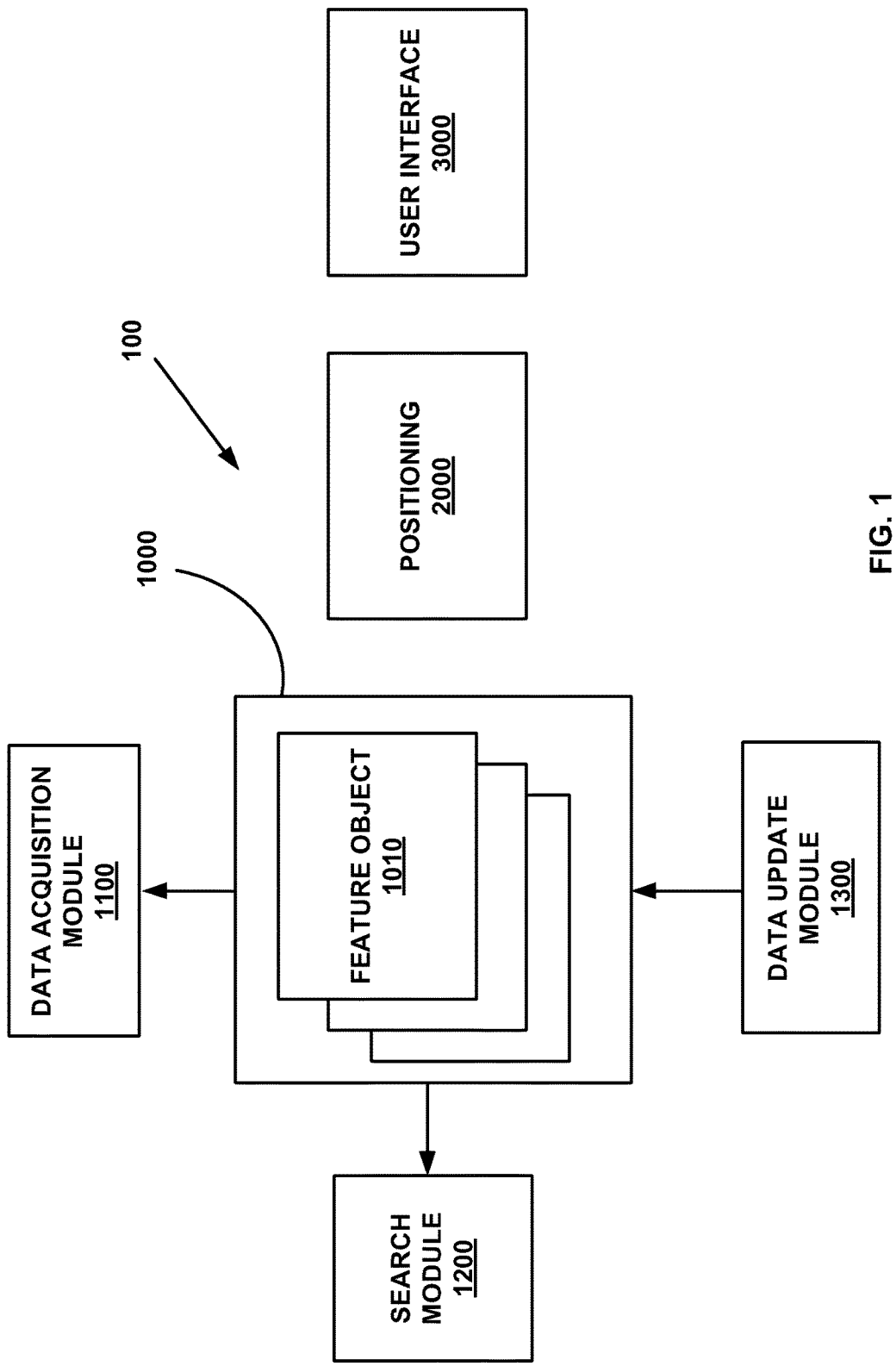
FIG. 1 is a block diagram showing the various components of the system according to the present invention.

The following description of the invention and its embodiments, including the referenced drawings, is meant for exemplifying illustration, and is not exhaustive or limiting in any way. The description below relates to three components of an embodiment of the invention, as depicted schematically in FIG. 1: a database component (1000) comprising feature-objects (1010), a Positioning component (2000) and a User interface component (3000).

According to embodiments of the invention, the database component (1000) is accessible by a data acquisition module (1100).

According to embodiments of the invention, the database component (1000) is accessible by a search module (1200).

According to embodiments of the invention, the database component (1000) is accessible by a data update module (1300).

Feature Objects (1010)

Figure 1A:
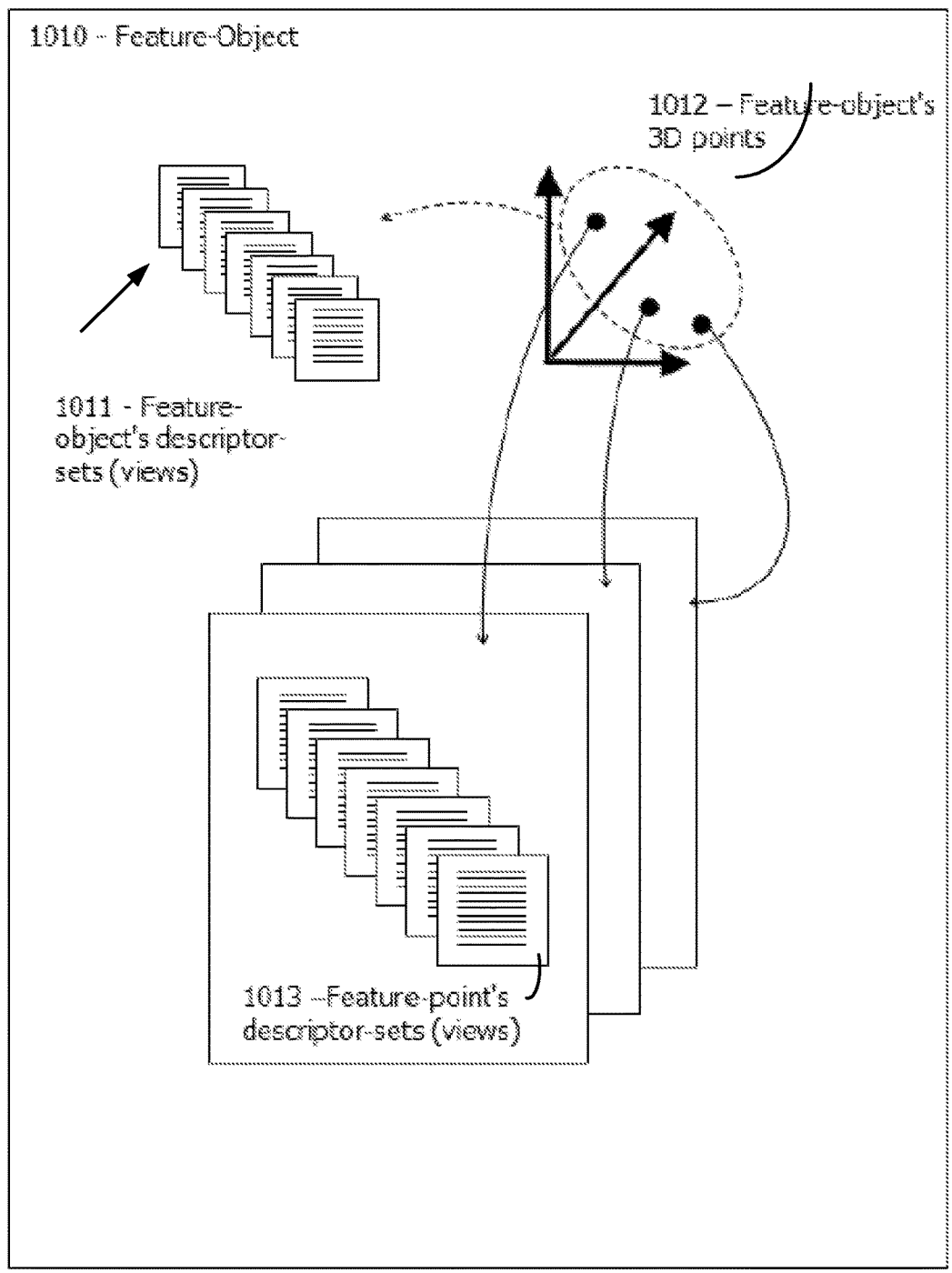
FIG. 1A is a schematic representation of a feature-object embodiment.

The described embodiment of the invention comprises a database component (1000), which is configured to store a plurality of feature-objects (1010). Each feature-object, as depicted in FIG. 1A, comprises at least one set of descriptors (1011). Each feature-object further comprises at least one feature-point (1012). Each said feature-point comprises the coordinates of a real 3D point in the venue where positioning is required. Each said feature-point may further comprise at least one descriptor-set, or view (1013), derived from a digital image of the said 3D point. All said descriptor-sets, or views, are organized so as to facilitate retrieval of relevant feature-objects and corresponding feature points from a query-descriptor-set. Each of the said 3D points may, and generally does appear in a plurality of digital images, and may thus be associates with a plurality of views that describe the projections of said one point in a corresponding plurality of digital images in which it appears.

Figure 2:
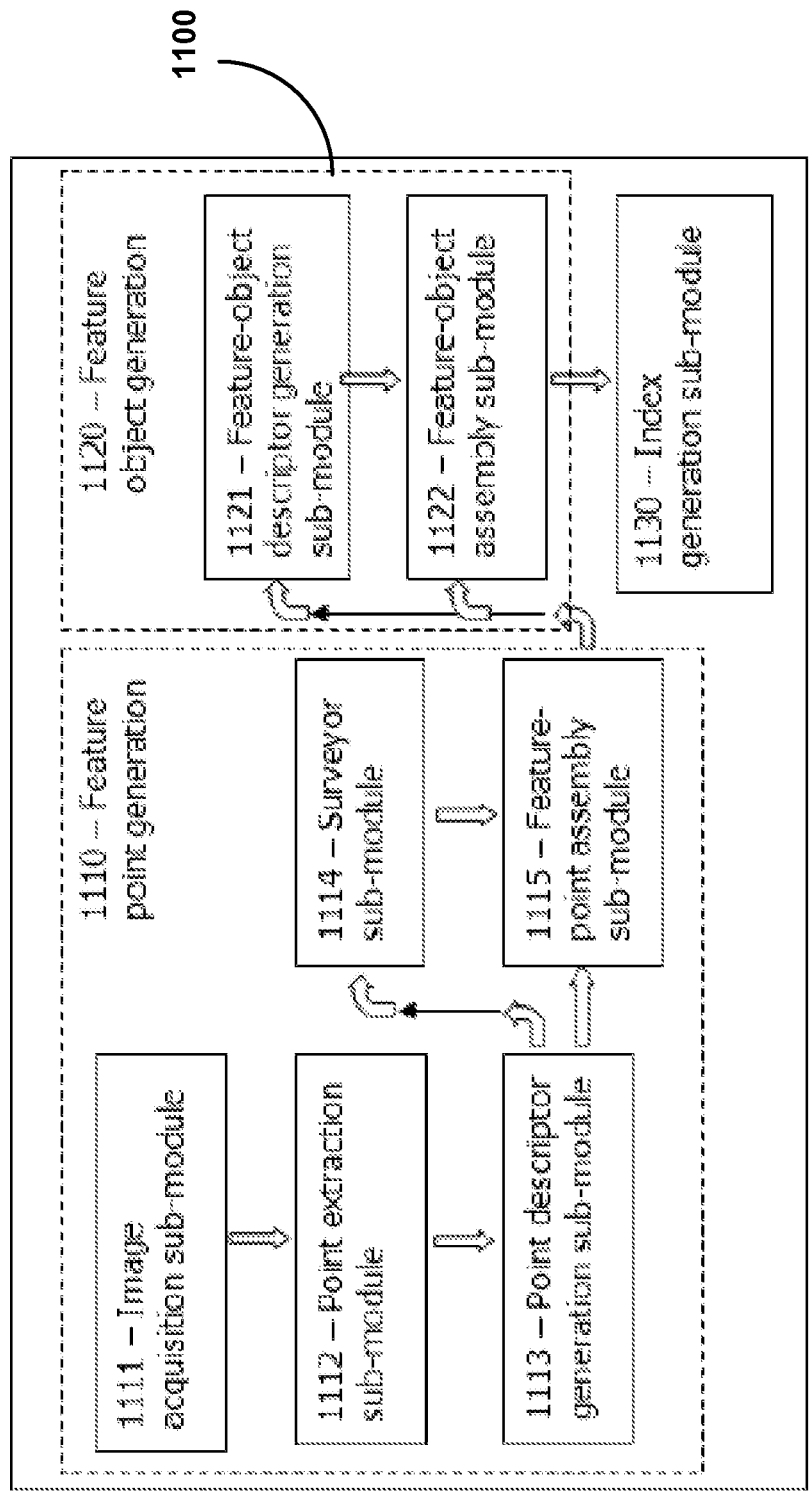
FIG. 2 is a schematic representation of an embodiment of the data acquisition module.

FIG. 2 is a schematic representation of an embodiment of the data acquisition module (1100) according to embodiments of the present invention,
comprising a feature-point generation sub-module (1110) configured to obtain 3D coordinates and compute feature-point-descriptor-sets for a multitude of feature-points (1012).

The data acquisition module (1100) may further comprise a feature-object generation sub-module (1120) configured to compute a plurality of feature-objects (1010) from the said feature-points (1012).

The data acquisition module (1100) may further comprise an indexing sub-module (1130), configured to organize said feature-objects (1010) data in a manner facilitating subsequent search and retrieval of feature-points (1012) that match an input query.

According to embodiments of the invention, the feature-point generation sub-module (1110) comprises an image-acquisition sub-module (1111) configured to acquire a plurality of digital images from a corresponding plurality of vantage points;

The feature-point generation sub-module (1110) may further comprise a point extraction sub-module (1112), configured to extract a plurality of 2D point from each of the said plurality of digital images. Being a point in an image, each said 2D point is a projection of a real 3D point onto the image.

The feature-point generation sub-module (1110) may further comprises a point-descriptor generation sub-module (1113), configured to compute a set of descriptors, or views, for each of the said plurality of 2D points, extracted from said plurality of digital images.

The feature-point generation sub-module (1110) may further comprise a surveyor sub-module (1114), configured to obtain the precise coordinates of each said real 3D point;

The feature-point generation sub-module (1110) may further comprise a feature-point assembly sub-module (1115), configured to form a feature-point entity (1012) from said coordinates of each of said real 3D points and from all descriptor-sets, or views (1013) of said real 3D point.

According to embodiments of the invention, the feature-object generation sub-module (1120) comprises a Feature-object descriptor generation sub-module (1121) configured to compute at least one set of feature-object descriptor-set (1011). Said feature-object descriptor set may, for example, represent relationships between feature-points comprised by said feature-object.

The feature-object generation sub-module (1120) may further comprise a Feature-object assembly sub-module (1122), configured to form a plurality of feature-objects (1010), each from a group of one or more related feature-points (said relation based for example on certain topological relationships between said feature points), and all descriptor-sets (views) of said group;

According to embodiments of the invention, the indexing sub-module (1130) is configured to index and organize the said feature-object descriptor-sets to facilitate efficient and robust retrieval of descriptor-sets that match an input query descriptor-set.

Figure 3:
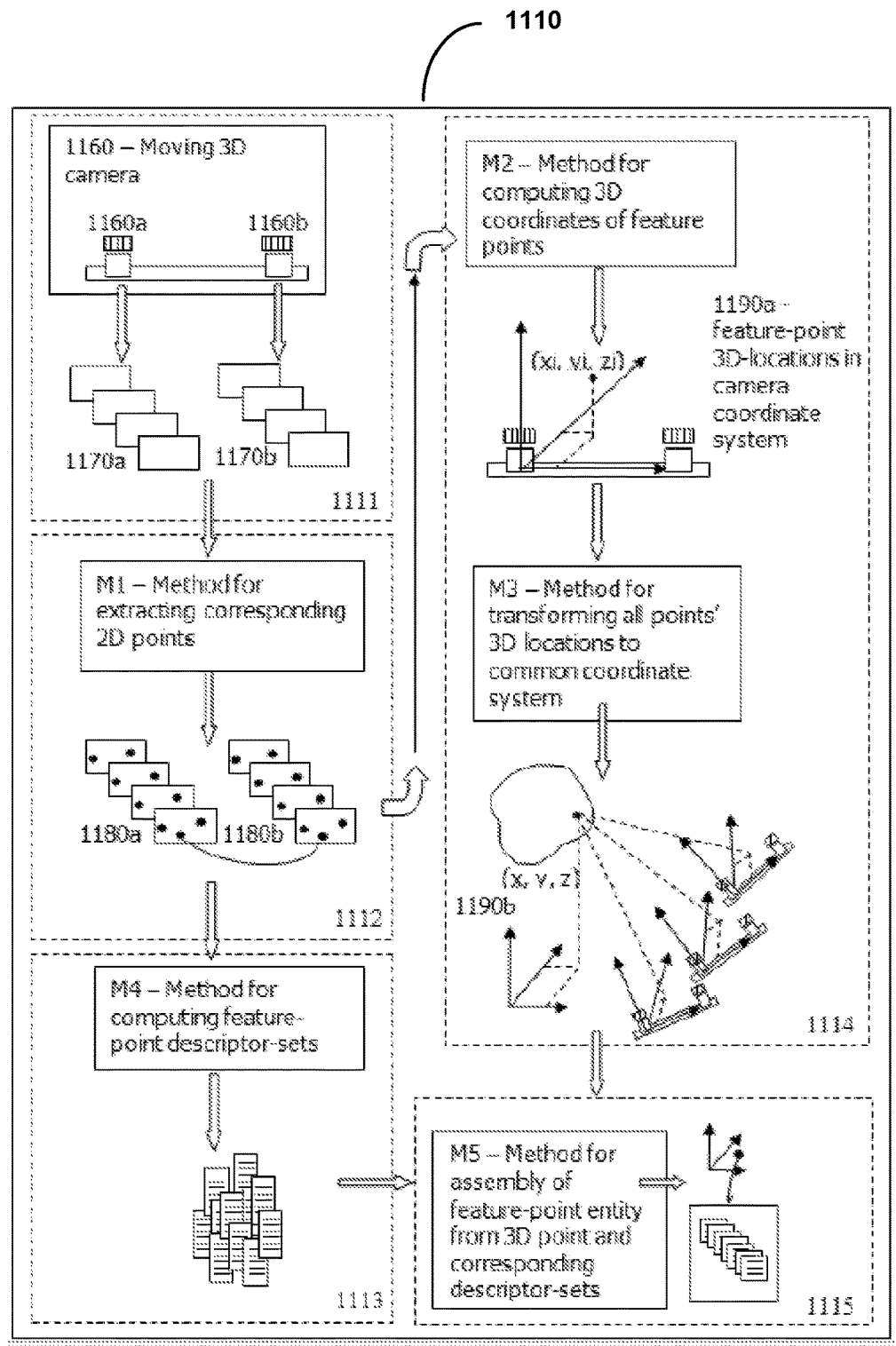
FIG. 3 is a detailed schematic representation of an embodiment E1 of the feature-point-generation sub-module.

FIG. 3 is a detailed schematic representation of an embodiment El of the feature-point generation sub-module 1110.

According to the embodiment (E1), the feature-point-generation sub-module (1110) comprises an image-acquisition sub-module (1111), a point-extraction submodule (1112), a point-descriptor-generation sub-module (1113), a surveyor sub-module (1114), and a feature-point-assembly sub-module (1115).

According to the embodiment (E1), the image-acquisition sub-module (1111) comprises an imaging apparatus (1160) configured to acquire and record sequences of three-dimensional (stereoscopic) images, as described below.

The said apparatus (1160) comprises at least two digital imaging means, e.g. video cameras (1160a, 1160b), configured to move in a rigid and known mutual spatial configuration.

The said cameras are further configured to produce a sequence of image-sets (1170), each set comprising at least two images (1170a, 1170b) taken correspondingly and simultaneously by the at least two cameras (1160a, 1160b), with substantially overlapping fields-of-view.

According to the embodiment (E1), the point extraction sub-module (1112) comprises a Corresponding-Features-Extraction method (M1) configured to extract sets of corresponding feature-points (1180a, 1180b) from the at least two digital images (1170a, 1170b) of every given set of images in the said sequence.

According to the embodiment (E1), the surveyor sub-module (1114) comprises a 3D reconstruction method (M2) configured to compute the precise 3D locations (1190a), expressed in the camera coordinate system, of the real-world point depicted by each said corresponding feature-point set. For the computation, said method uses camera known spatial configuration, camera intrinsic parameters, and feature-point pixel locations in the at least two images of the set. The said method computes the locations of a plurality of 3D points (a.k.a "point cloud").

According to the embodiment (E1), the surveyor sub-module (1114) further comprises a Coordinate-Transformation method (M3) configured to transform the 3D locations computed by method M2, from being expressed in camera coordinate system (which may vary due to camera motion), to be expressed in a common, fixed coordinate system. For this computation, the said apparatus (1160) is moved in a manner that enables it to produce and record a sequence of digital image-sets (1170) from a corresponding sequence of vantage points (trail). The vantage points are selected so as to produce a sequence of 3D point clouds with substantial overlap of participating 3D points in successive point clouds. Said method then tracks the participating 3D points, and computes a sequence of spatial transformations between successive point clouds, and combines the transformations incrementally to obtain the transformation for each point cloud local coordinates to the common fixed coordinate system (1190b) collocated and aligned with the first vantage point—the beginning of the trail. Finally, by selecting a relatively small number of participating points, of which the actual real world coordinates are known from an outside source (a.k.a "anchor points"), transformations are adjusted so they can produce the actual real-world coordinates for every extracted 3D point.

According to the embodiment (E1), the point-descriptor generation sub-module (1113) further comprises a Descriptor extraction method (M4) configured to compute the descriptors for all feature-points extracted by method M1. Said descriptors are then associated with the 3D locations of the corresponding real-world points.

According to the embodiment (E1), the feature-point assembly sub-module (1115) further comprises a Feature-point assembly method (M5) configured to generate a feature-point entity (1010) from said 3D coordinates (1190b) of a real-world point (1012) and all descriptor-sets, or views (1013) of said point.

Figure 4:
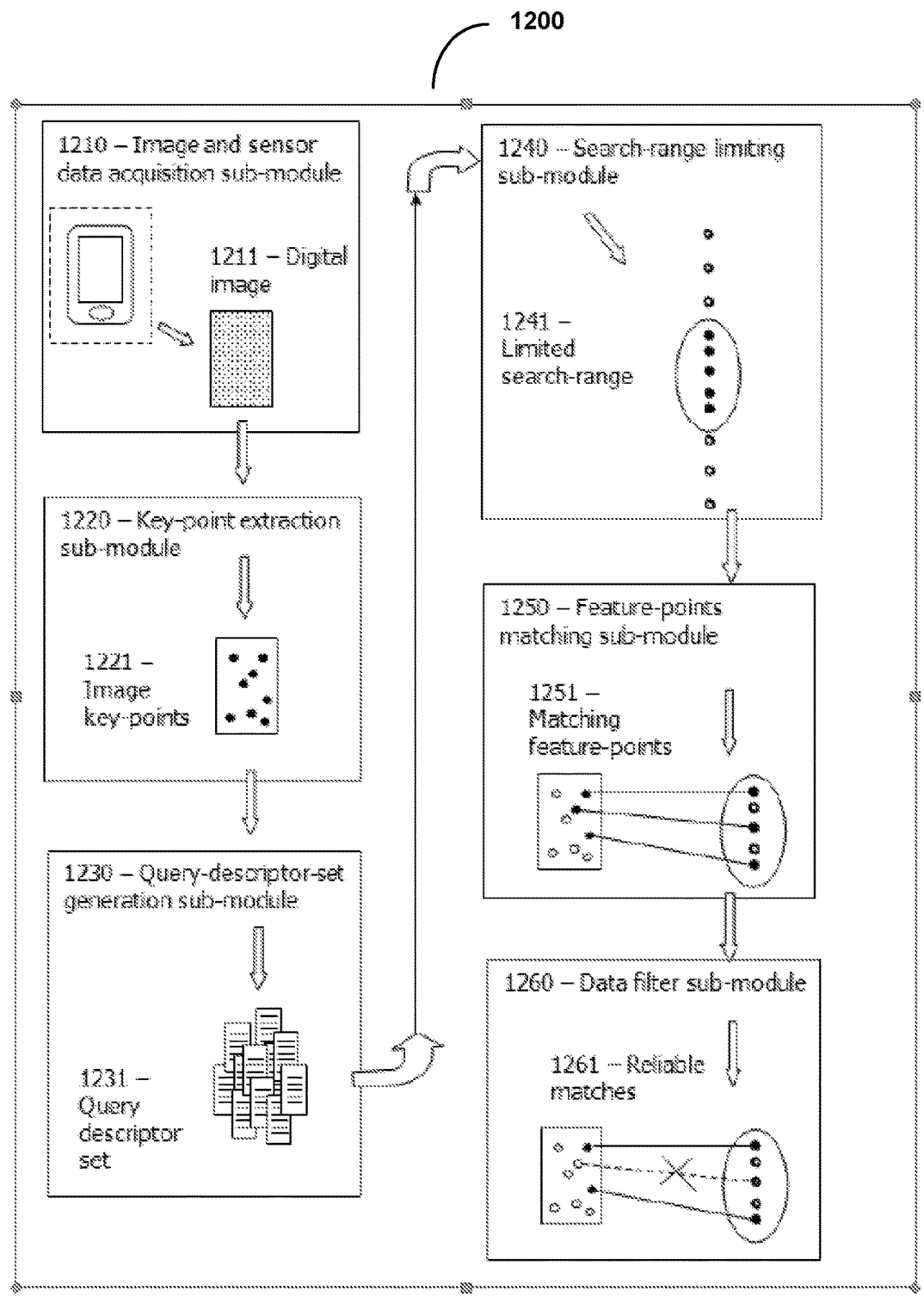
FIG. 4 is a schematic representation of an embodiment of the database search module.

According to embodiments of the present invention, as depicted in FIG. 4, the search module (1200) is configured to generate and process a query for the database. The said search module is further configured to retrieve the feature points matching each of the said query's key-points. The 3D data associated with said retrieved feature points, along with 2D data associated with the said query's key-points, are used as input to the positioning component (2000), described below.

According to embodiments of the present invention, the search module (1200) comprises an Acquisition sub-module (1210), which is configured to acquire and store at least one digital image (1211). The said acquisition sub-module is further configured to optionally acquire data from a plurality of sensors, including linear and rotational inertial sensors and magnetic sensors, if such sensors are available. In a possible embodiment of the acquisition sub-module (1210), said sub-module is installed on a mobile device (such as a "smart phone"), and makes use of the said mobile device's built in camera and sensors.

According to embodiments of the present invention, the search module (1200) further comprises a Key-point extraction sub-module (1220), which is configured to select and extract a plurality of key-points (1221) from the said digital image (1211), and store said key-points along with their 2D pixel coordinates.

According to embodiments of the present invention, the search module (1200) further comprises a Query-descriptor-set generation sub-module (1230), which is configured to compute a set of descriptors for each of the said plurality of key-points (1221). Said descriptors are devised to facilitate searching and matching descriptors of feature-objects and feature-points stored in the database. A query (1231) comprises all the descriptor-sets computed for the plurality of key-points extracted from said digital image (1211).

According to embodiments of the present invention, the search module (1200) further comprises a Search-range-limiting sub-module (1240), which is configured to accept as input a query (1231) and retrieve a subset (1241) of the feature-points stored in the database. In a possible embodiment of the said sub-module (1240), the said retrieved subset (1241) constitutes a small fraction of all the data stored in the database, and contains feature points with substantial geographical proximity, having substantially greater probability of matching the query key-points. In a possible embodiment, said subset comprises one or more feature-objects (1010).

According to embodiments of the present invention, the search module (1200) further comprises a Feature points matching sub-module (1250), which is configured to retrieve for each of the said key-points (1221) in said query (1231) a matching feature-point (1251) in the database with a descriptor-set that substantially matches the said key-point's descriptor-set. The said matching sub-module (1250) is further configured to retrieve for each retrieved matching feature point (1251) the 3D coordinates (FIG. 3, 1190b) of the associated real 3D point. To reduce search time, in a possible embodiment of the said matching sub-module (1250), the search for a match is first conducted in the said subset (1241) retrieved by the Search-range-limiting sub-module (1240).

According to embodiments of the present invention, the search module (1200) further comprises a Data filter sub-module (1260), which is configured to filter said retrieved feature point data (1251) and to compile a set of consistent and reliable data (1261) that serves as input to the position computation component (2000) described below. In a possible embodiment, matches with inconsistent 2D or 3D data are removed, and so are matches with an inferior match score. The said data (1261) for each remaining match comprises at least the 2D pixel coordinates taken from the query (1231) point, and the corresponding 3D points' locations taken from the retrieved feature-point (1251).

Figure 5:
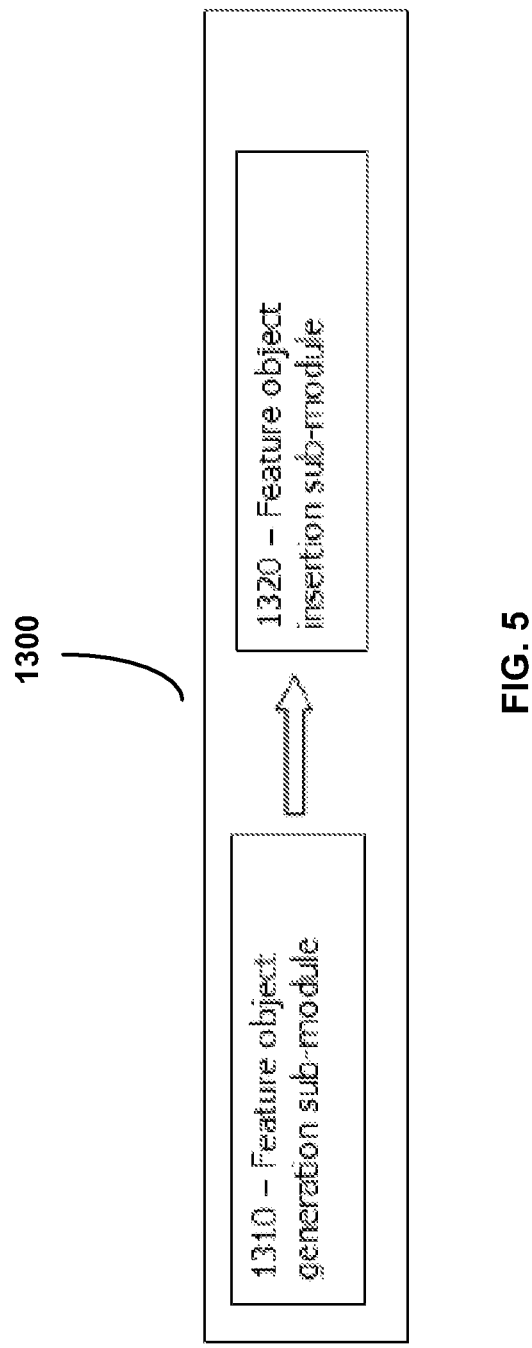
FIG. 5 is a schematic representation of an embodiment of the database update module.

The purpose of the database-update module (1300), schematically depicted in FIG. 5, is to substantially eliminate the need for a repeated application of the data acquisition module (1100) in order to keep the database (1000) current. Instead, the said update module is configured to generate up-to-date database entries from query data and positioning data obtained from a plurality of users, as described below.

According to embodiments of the present invention, the database-update module (1300) comprises a Feature-object-generation sub-module (1310), which is configured to compute new feature-object (1010) database entries.

The said feature-object generation sub-module is further configured to handle two types of new entries—a first type that associates (and adds) a new, up-to-date descriptor-set, or view (1013) to an "old" 3D point (1012) that is already included in at least one existing database entry, and a second type that consists of a newly computed 3D point location, associated with a corresponding new descriptor-set.

According to embodiments of the present invention, the database update module (1300) further comprises a Feature-object-insertion sub-module (1320), configured to update the feature-object database by integrating new feature-object entries into the said database, so that said entries can be included in subsequent searches by the search module (1200).

Figure 6:
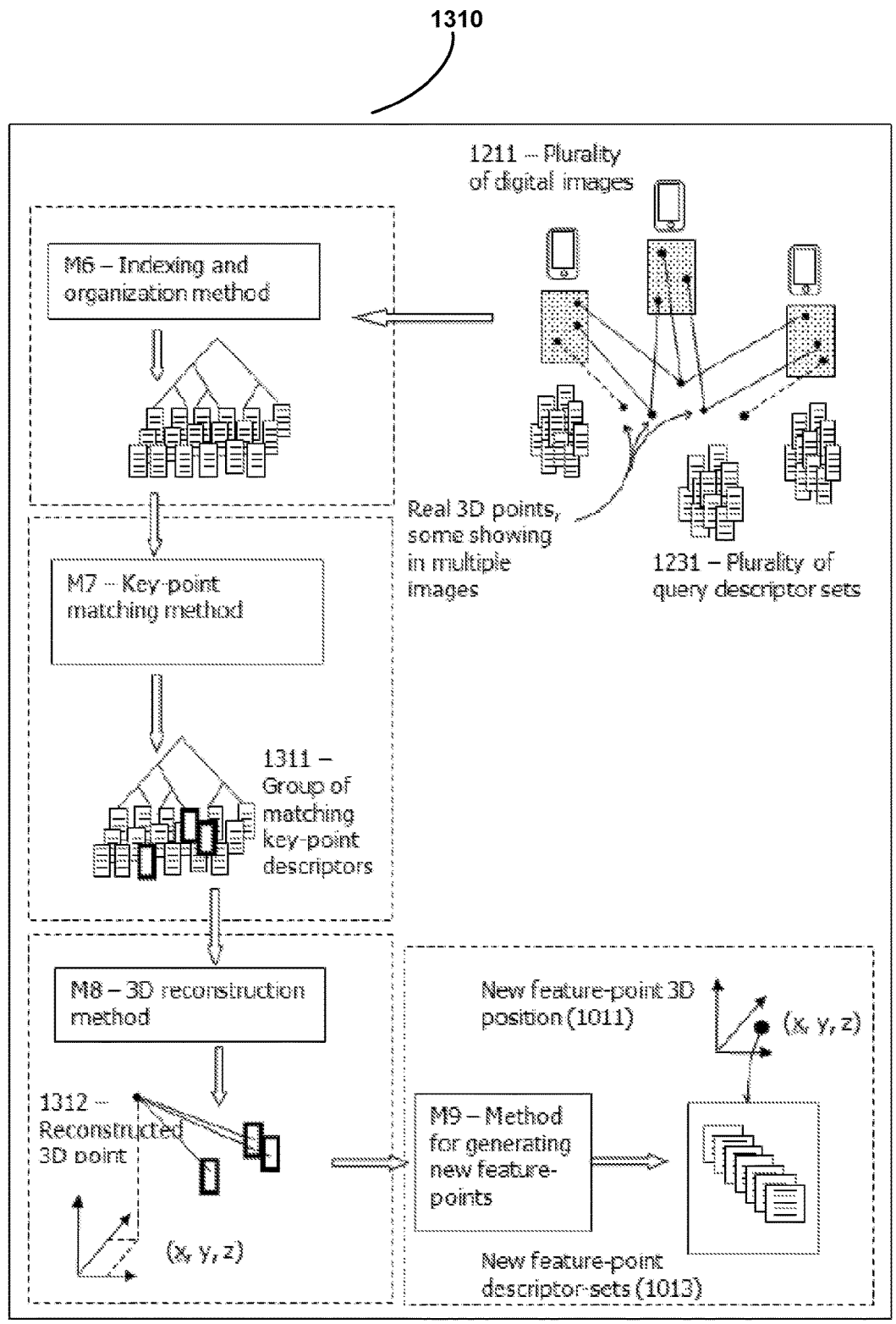
FIG. 6 is a schematic representation of embodiment E2 of Database Update-Feature-object-generation sub-module.

FIG. 6 is a detailed schematic representation of an embodiment E2 of the Database—Update-Feature-object-generation sub-module (1310).

According to the embodiment (E2), the feature-object generation sub-module (1310) comprises an indexing and organization method (M6), configured to organize the multitude of queries that have been collected by the database search module (1200) from a plurality of users, in a manner facilitating search, within said plurality of queries, for key-points with matching descriptor-sets. In a possible embodiment of method M6, the organization is based on the location and orientation of the camera used by the acquisition sub-module (1210) to produce the digital image (1211) containing said key-points. Said position and orientation are computed by the positioning component (2000), described below.

According to the embodiment (E2), the feature-object generation sub-module (1310) further comprises a key-point matching method (M7), configured to search among said plurality of queries, and extract pluralities of key-points (1311) with matching descriptor-sets.

According to the embodiment (E2), the feature-object generation sub-module (1310) further comprises a 3D location reconstruction method (M8), configured to accept as input the plurality of 2D pixel coordinates of said plurality of key-points (1311), the 3D locations and orientations of the respective plurality of cameras used by the acquisition sub-module (1210) to produce the plurality of digital images (1211) containing said plurality of key-point, and the said cameras' intrinsic parameters. Method M8 is further configured to use said input to compute the location (1312) of the real 3D point associated with said plurality of key-points (1311).

According to the embodiment (E2), the feature-object generation sub-module (1310) further comprises an entry formation method (M9), configured to form valid database entries (1010), each containing one of the descriptor-sets of the plurality of key-points (1311) and the computed real 3D location (1312) associated with said plurality. In a possible embodiment, method M9 is similar to method M5 (FIG. 3).

Position Computation Component (2000)

The invention further comprises a Position Computation component (2000) configured to accept as input a multitude of retrieved feature points, each said feature point comprises at least the 3D coordinates of the associated real-world point, and the 2D pixel location of the associated projection of said real-world 3D point on a camera sensor. The said Position Computation component is further configured to accept as input the intrinsic parameters of said camera. The said Position Computation component is further configured to use the inputs to compute the real-world position and direction of gaze of said camera.

Figure 7A:
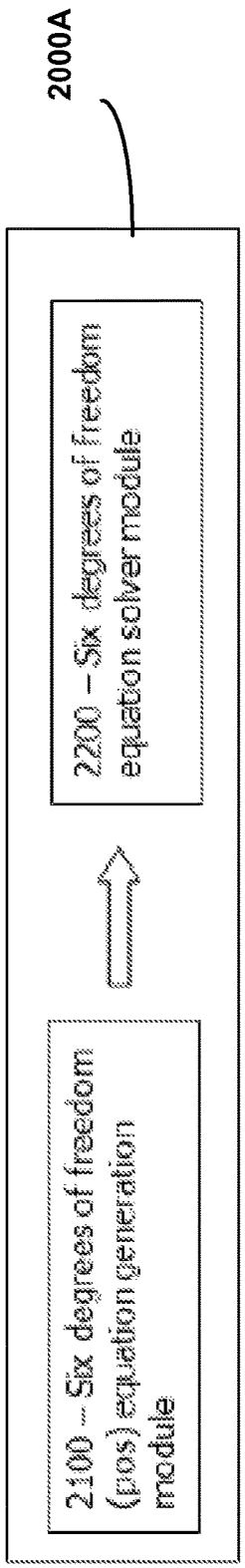
FIGS. 7A-7C are schematic representations of three embodiments (E3, E4, E5) of the Positioning component.

A first possible embodiment (E3) of the Position component (2000), as depicted in FIG. 7A, is configured to compute the said position and angel-of-gaze (orientation) by solving a simultaneous system of equations derived from the inputs. The said embodiment comprises an equation generation module (2100) configured to generate a simultaneous system of equations. The unknowns are the 3D real-world coordinates of the said camera center, and the rotation matrix defining its orientation.

The said embodiment (E3) further comprises a Solver module (2200) configured to solve the said system of equations and compute values of the unknowns that best satisfy the set of equations.

Figure 7B:
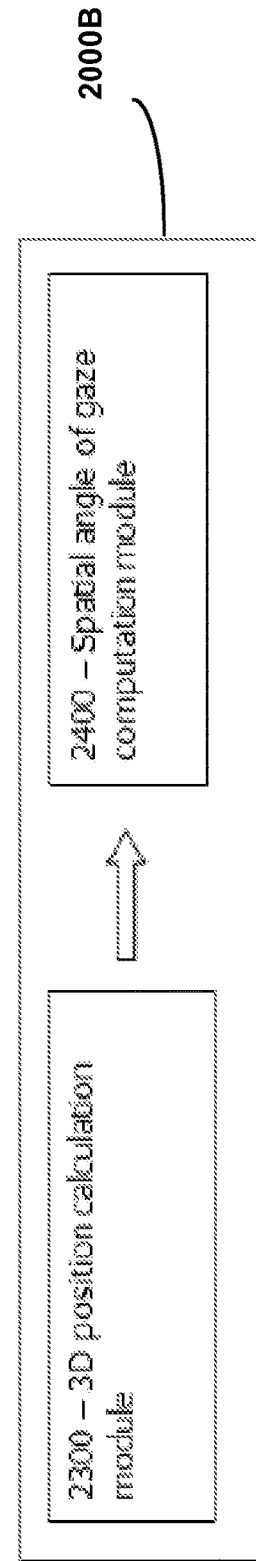

A second possible embodiment (E4) of the Positioning Component (2000), as depicted in FIG. 7B, is configured to compute the said 3D coordinates of the camera center separately from computing said camera orientation. The said embodiment comprises a 3D position calculation module (2300) configured to compute the said 3D coordinates, and further comprises an Orientation module (2400) configured to compute the rotation matrix defining said camera orientation, or spatial angle of gaze.

Figure 7C:
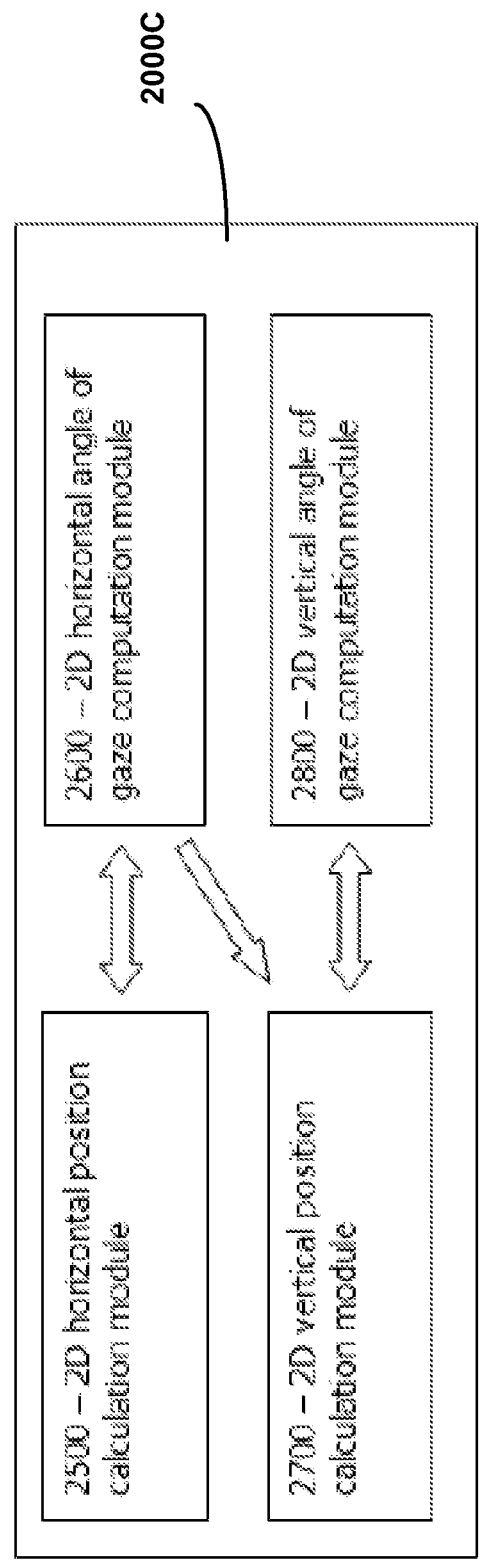

A third embodiment (E5) of the Positioning Component (2000), as depicted in FIG. 7C, is configured to compute the said camera position and orientation separately in a horizontal plane and in a vertical plane.

The said embodiment (E5) comprises a camera-horizontal-position-calculation module (2500) for computing said camera position in the horizontal plane (defined by the x and z axes). The said module is configured to accept as input 2 of the 3 real-world coordinates (x and z) and 1 of the 2 pixel coordinates (x) of all said retrieved feature-points (1190*b*). Said module is further configured to compute said 2 of the 3 real-world coordinates of the said camera position.

The said embodiment (E5) further comprises a camera-horizontal-gaze-angle module (2600) for computing said camera orientation in the said horizontal plane. The said module is configured to accept as input 2 of the 3 real-world coordinates (x and z) and 1 of the 2 pixel coordinates (x) of all said retrieved feature-points (1190*b*). Said module is further configured to accept as input said 2 of 3 real-world coordinates of the said camera position. The said module is further configured to compute said camera orientation (gaze angle) in the said horizontal plane.

The said embodiment (E5) further comprises a camera-vertical-position-calculation module (2700) for computing said camera position in the vertical plane (defined by the y and z axes). The said module is configured to accept as input 2 of the 3 real-world coordinates (y and z) and 1 of the 2 pixel coordinates (y) of all said retrieved feature-points (1190*b*). Said module is further configured to accept as input the horizontal orientation (computed by module 2600). Said module is further configured to compute said 2 of the 3 real-world coordinates (y and z) of the said camera position.

The said embodiment (E5) further comprises a camera-vertical-gaze-angle module (2800) for computing said camera orientation in the said vertical plane. The said module is configured to accept as input 2 of the 3 real-world coordinates (y and z) and 1 of the 2 pixel coordinates (y) of all said retrieved feature-points (1190b). Said module is further configured to accept as input said 2 of 3 real-world coordinates of the said camera position. The said module is further configured to compute said camera orientation (gaze angle) in the said vertical plane.

A first possible embodiment of the horizontal position and orientation calculation modules (2500, 2600) and a first possible embodiment of the vertical position and orientation calculation modules (2700, 2800) are each configured to generate and solve a simultaneous system of equations. Each said solution comprises a 2 dimensional position and a single angle of gaze that best satisfy the said system of equations.

Figure 8A:
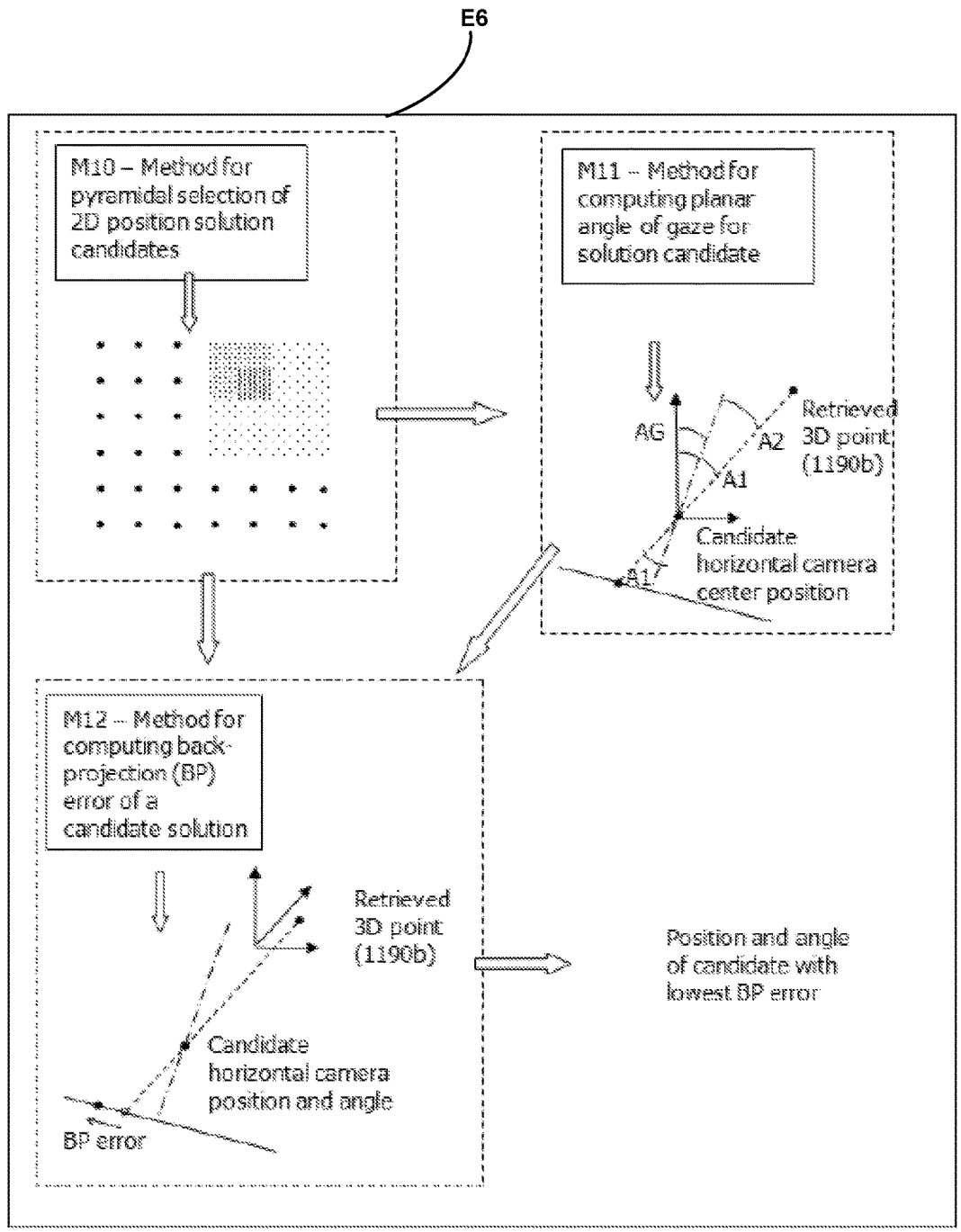
FIG. 8A is a schematic illustration of a second embodiment (E6) of the Horizontal position and angle calculation modules.
Figure 8B:
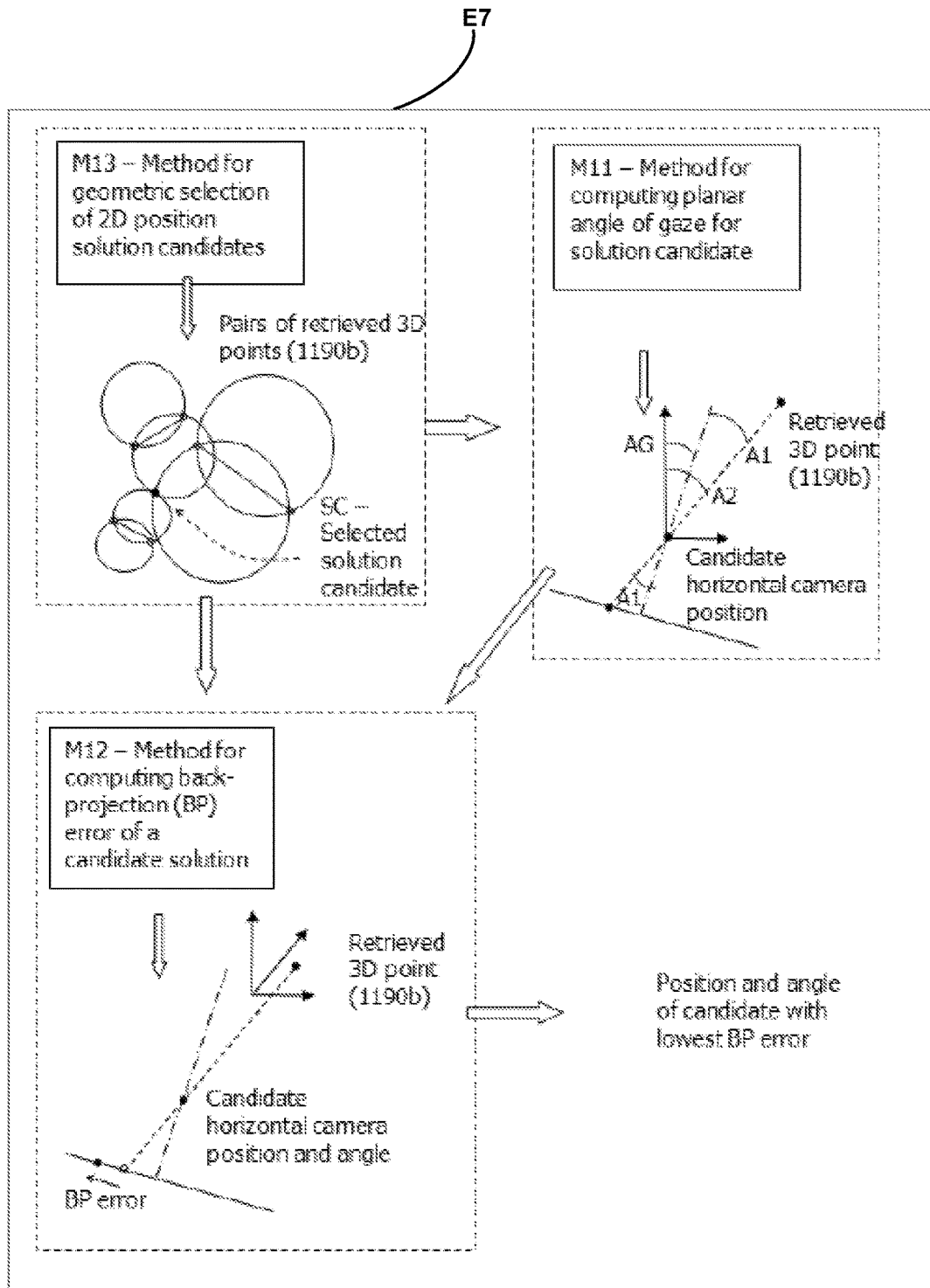
FIG. 8B is a schematic representation of a third embodiment (E7) of the Horizontal position and angle calculation modules.

A second and a third possible embodiment (E6, E7 respectively) of the horizontal position and orientation calculation modules (2500, 2600) and of the vertical position and orientation calculation modules (2700, 2800) are each (similarly) configured to generate a plurality of position candidates, and to compute a score for each of the said plurality of candidate solutions, and to select the candidate with the best score as the solution, as illustrated in FIGS. 8A and 8B respectively, and described below.

The second possible embodiment (E6) of the horizontal position and angle calculation modules (2500, 2600), as depicted in FIG. 8A, comprises a method (M10) for iterative selection of 2D position solution candidates.

The said method (M10) is configured to generate a grid of 2D positions confined to a region around a given center, and with given spacing between them. The said method is further configured to iterate, each iteration using a possibly smaller region and possibly tighter spacing than the previous iteration; the center used in each iteration is a selected position out of the said grid of positions generated in the previous iteration.

The said second embodiment (E6) further comprises a method (M11) for computing planar angle of gaze for solution candidate. The said method is configured to accept as input a candidate 2D camera position (x, z), the 2D projection coordinates (x, z) of the said plurality of retrieved feature points (1190b), the corresponding 1D pixel coordinate (x), and the camera intrinsic parameters. The said method is further configured to compute for each of the said plurality of retrieved feature points the gaze angle (AG) as the difference between two angles—a first angle (A2) between the z-axis and the line connecting the said candidate center position and the said retrieved point, and a second angle (A1) between the line of sight to the said retrieved point and the camera axis. The said method is further configured to compute and return a statistical representative (e.g., mean or median) of the multitude of gaze angle results calculated for said camera center position candidate, and the multitude of retrieved feature points.

The said second embodiment (E6) further comprises a method (M12) for computing back-projection (BP) error of a candidate solution. Said method is configured to accept a first input comprising a candidate 2D camera position (x, z), a second input comprising the 2D projection coordinates (x, z) of the said multitude of retrieved feature points (1190b), a third input comprising the corresponding 1D pixel coordinate (x), a fourth input comprising the camera intrinsic parameters, and a fifth input comprising the camera gaze angle. The said method is further configured to compute for each of the plurality of retrieved feature points, a back-projection (BP) pixel coordinate on the camera sensor. The said method is further configured to calculate for each of the said multitude of feature points the difference (BP error) between the said computed back-projected pixel location, and the said given pixel location. The said method is further configured to compute and return a statistical representative (e.g., mean or median) of the plurality of computed back-projection (BP) errors.

The said second embodiment (E6) is further configured to use the back-projection error (BP error) returned by method M12 to evaluate the merit of the candidate positions, and for selecting the best candidate as the center for the next iteration of method M10. On the last iteration of method M10, the said best candidate position and its associated angle of gaze are returned as the said modules' (2500, 2600) solution.

The third possible embodiment (E7) of the horizontal position and angle calculation modules (2500, 2600) is similar to embodiment E6, but instead of M10, the iterative candidate 2D position selection method of E6, the said embodiment comprises a method (M13) for geometric selection of 2D position solution candidates, as depicted in FIG. 8B. The said method (M13) is configured to use geometric constraints to limit the number of position candidates. The said method is illustrated in more details in FIG. 9, and is further configured to generate one or more 2D position candidate for merit evaluation.

Two possible embodiments of the vertical position and gaze angle calculation modules (2700, 2800) are respectively similar to embodiments E6 and E7 of the horizontal position and gaze angle calculation modules (2500, 2600), but each further comprises a coordinate transformation method that is configured to horizontally rotate the feature point coordinates by the horizontal gaze angle computed by module 2600 before they are used as input to modules 2700 and 2800, and then rotates the resulting vertical position back via the inverse of said transformation.

Figure 9:
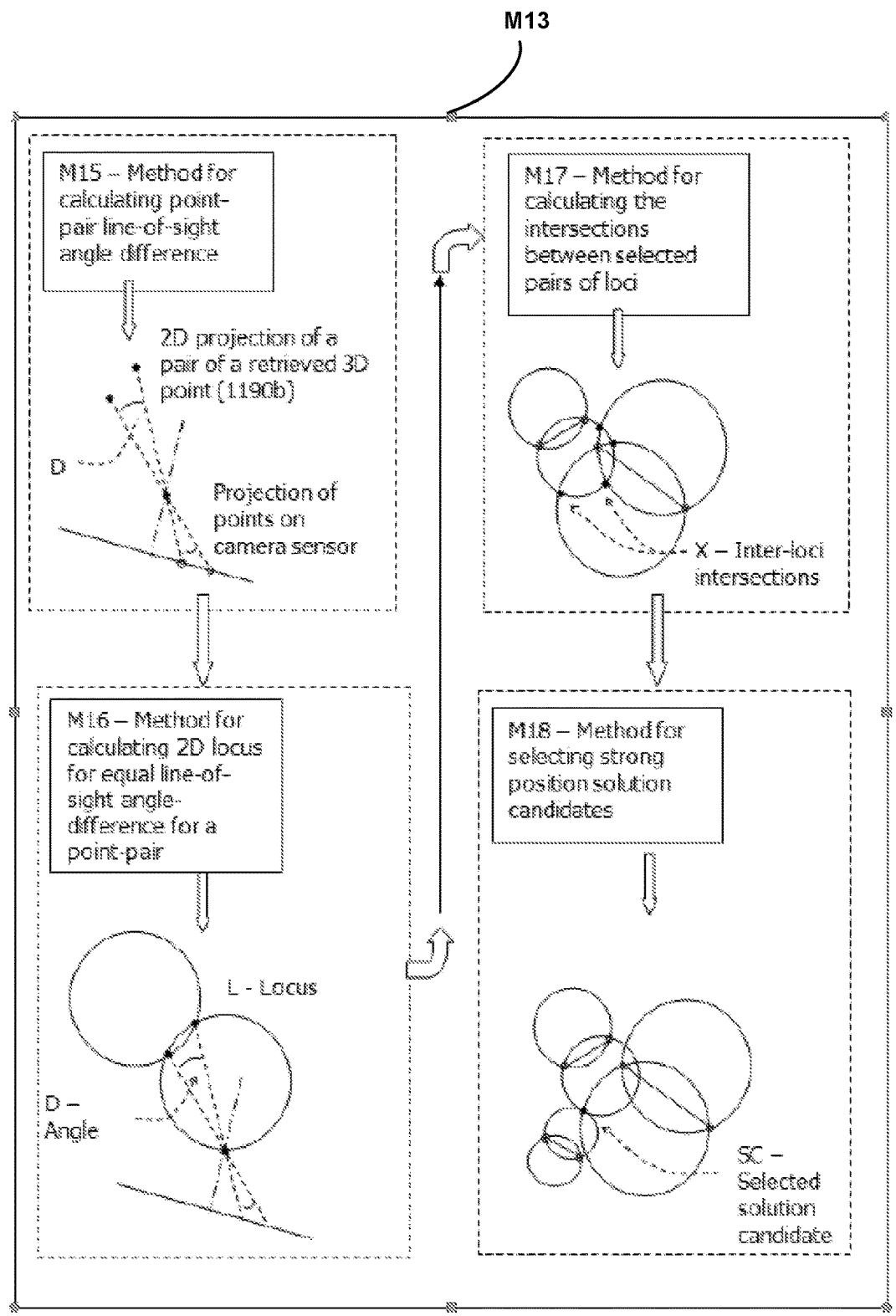
FIG. 9 is a schematic representation of an embodiment (E8) of the Method for geometric selection of 2D position solution candidates.
Figure 10:
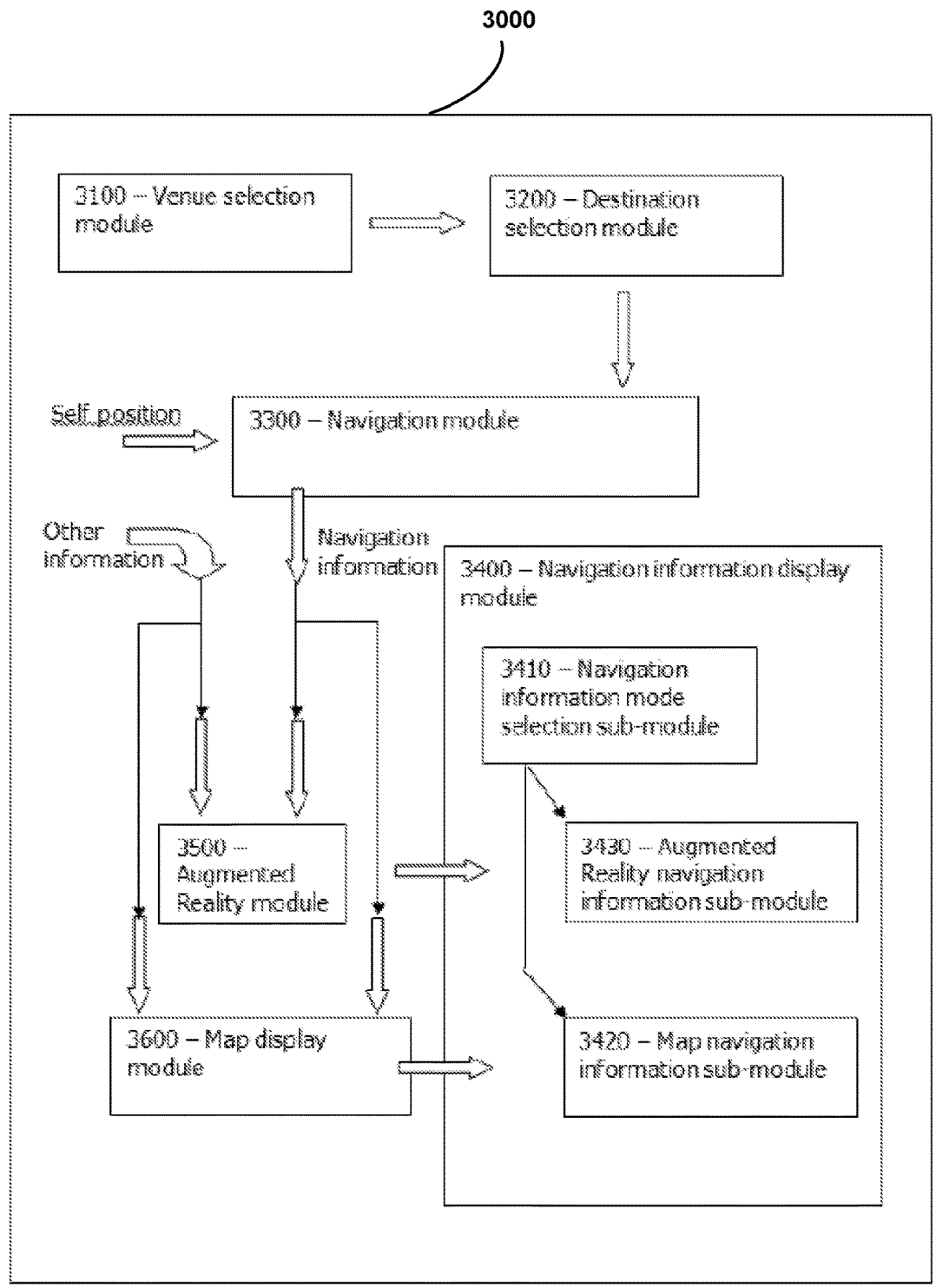
FIG. 10 is a schematic representation of an embodiment of the User Interface component.

A possible embodiment (E8) of said Method (M13) for geometric selection of 2D position solution candidates, as depicted in FIG. 9, comprises a Method (M15) for calculating point-pair line-of-sight angle difference. The said method (M15) is configured to accept as a first input the camera intrinsic parameters, and as a second input the two 1D pixel coordinates associated with a pair of retrieved feature-points. The said method is further configured to calculate for each pair of retrieved feature-points (1190b) the angle (D) between the two projection lines through the camera center to the points in the said pair.

The said embodiment (E8) further comprises a Method (M16) for calculating 2D locus for a given line-of-sight angle-difference subtended by a point-pair. The said method is configured to compute and store for each said pair of points the radius and centers of the two circles that are collectively the locus of a given (inscribed) angle subtended by the said pair of points.

The said embodiment (E8) further comprises a Method (M17) for calculating the intersections between selected pairs of loci. The said method is configured to select pairs of loci subtended by disjoint feature-point pairs. The said method is further configured to compute for each said pair of loci the positions where the two loci in the said pair of loci intersect each other. With perfect data, there will be a single position that is common to all loci, and that would be the desired solution position. With imperfect data, such a position may not exist, and there might instead be clusters of intersection points.

The said embodiment (E8) further comprises a Method (M18) for selecting strong position solution candidates. The said method is configured to generate a 2D histogram of loci intersection positions. The said method is further configured to calculate intersection density. The said method is further configured to identify density peaks, and return the positions of said peaks as the camera-center 2D position candidates for merit evaluation.

User Interface Component (3000)

Embodiments of the invention further comprise a User interface component (3000) that is installed on the "client" mobile device. The said user interface component is configured to enable the user of said mobile device to interact with the invention software and hardware by communicating requests and intentions, and receiving desired information.

According to embodiments of the invention, the said user interface component (3000) may comprise a venue selection module (3100) configured to allow the user of said mobile device to specify the area or venue where use of the system is intended.

According to embodiments of the invention, the said user interface component (3000) may further comprise a destination selection module (3200) configured to allow the user of said mobile device to specify the destination to which said user desires to navigate.

According to embodiments of the invention, the said user interface component (3000) may further comprise a navigation module (3300) configured to derive information by which said user could navigate to, and reach the desired destination.

According to embodiments of the invention, the said user interface component (3000) may further comprise a navigation information display module (3400) configured to present said navigation information to said user.

The said navigation information display module (3400) may further comprises a navigation information mode selection sub-module (3410) configured to allow the user of said mobile device to specify the form in which said navigation information is presented to said user, as described below.

The said navigation information display module (3400) may further comprise a map navigation information sub-module (3420) configured to present said navigation information, according to said user's choice, by displaying a map on the said device's screen, and marking on the map at least the user's current position, the direction in which said user pointed the camera, the destination position, and a route by which said user can reach the destination.

The said navigation information display module (3400) may further comprise an Augmented Reality navigation information sub-module (3430) configured to present the navigation information, according to said user's choice, as overlay of graphical navigation symbols (such as arrows, text, or icons).

According to embodiments of the invention, the said user interface component (3000) may further comprise an Augmented Reality module (3500) configured to display the image currently taken by said mobile device's camera. Said module is further configured to perform the computations required for augmenting said image by overlaying graphical symbols. Said symbols may, for example, include navigation information (to be used in sub-module 3430), announcements of location-based-services, messages, warnings, billboards, or avatars of other users currently in the said venue.

An embodiment of the said user interface component (3000) may further comprise a Map display module (3600) configured to retrieve and display a map of the venue on the mobile device's screen. Said module may further be configured to perform the computations required for overlaying graphical symbols on the map. Said symbols may include, for example, navigation information (to be used in sub-module 3420), announcements of location-based-services, messages, warnings, billboards, or avatars of other users currently in the said venue.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A computerized system comprising:
a database configured to store a plurality of feature-objects, each feature-object comprising:
at least one set of feature-object-descriptors; and
at least one feature-point, each one of said at least one feature point comprising at least:
spatial coordinates of a 3D real-world point; and
at least one point-descriptor-set;
a processing unit configured to execute computer program commands, the processing unit comprising:
a Data-acquisition software module configured to generate said plurality of feature-objects and insert them into said database, said generation comprising generating a sequence of point-clouds, each one of said point clouds comprising 3D coordinates of a plurality of 3D points, and said sequence corresponding to a respective sequence of vantage points;
a Query-generation-and-search software module configured to generate or receive as input at least one query-feature-object and provide at least one feature-object that matches said at least one query-feature object; and
a Database-update software module configured to generate up-to-date database entries from query data and positioning data obtained from a plurality of users.

2. The computerized system of claim 1, wherein said Data-acquisition module comprises at least one of the following modules:
a feature-point-generation software module configured to generate at least one feature-point, each from said coordinates of a real-world 3D point and from at least one point-descriptor-set ;
a feature-object-generation software module configured to form at least one feature-object entity, each from one or more related feature-points and from a corresponding feature-object-descriptor-set; and
an index-generation software module, configured to index and organize said feature-objects according to said feature-objects' descriptor-sets, said indexing and organization designed to facilitate efficient and robust retrieval of feature-objects with descriptor-sets that match input query-object-descriptor-sets.

3. The computerized system of claim 2, wherein said feature point generation software module comprises:
an image-acquisition software sub-module configured to acquire a plurality of digital images from a respective plurality of vantage points, said image-acquisition sub-module comprising a digital-imaging software module configured to acquire and record sequences of 3D images;
a point-extraction software sub-module configured to select a plurality of 2D points from each of a plurality of digital images and to extract pixel positions of said plurality of 2D points, each said 2D points being a 2D projection of a real-world 3D point onto a corresponding digital image;

a point-descriptor generation software sub-module configured to compute at least one set of descriptors for each of said feature points;

a surveyor software sub-module configured to compute real-world 3D-coordinates of a plurality of 3D points, said surveyor sub-module comprising a 3D-reconstruction software module (M2) configured to compute 3D coordinate values at least one real-world point depicted in a digital image set, said values expressed in a local coordinate system collocated with a digital imaging device and a Coordinate Conversion software module, configured to convert 3D coordinate values from a moving, local coordinate system to a fixed coordinate system; and a feature-point assembly software sub-module, configured to form a feature-point entity from said coordinates of each of said real 3D points and from all descriptor-sets, or views of said real 3D point.

4. The computerized system of claim 3, wherein the Coordinate-Conversion software module is further configured to execute at least one of the following steps:

receive as input a sequence of 3D point-clouds with substantial overlap of 3D points comprised in successive point-clouds, to compute a sequence of spatial transformations between said successive point-clouds;

combine said spatial transformations incrementally to obtain the transformation of each point-cloud local coordinate to a common, fixed coordinate system; and receive as inputs a substantially small plurality of participating points (anchor points) of which the actual real-world coordinates are known from an outside source, to adjust said spatial transformations, and apply said adjusted transformations to transform 3D coordinates from moving, local coordinates to said actual real-world coordinates.

5. The computerized system of claim 1, wherein said at least one point-descriptor-set is derived from a digital image in which said 3D point is depicted.

6. The computerized system of claim 1, wherein said Query-generation-and-search software module comprises at least one of the following:

an imaging-and-sensor-data-acquisition module configured to execute at least one of the following:
acquire and store at least one digital image; and
acquire data from a plurality of sensors, selected from the group consisting of at least: linear inertial sensors, rotational inertial sensors and magnetic sensors; and a feature-point-matching software module configured to execute at least one of the following steps:
retrieve for each key-point in a query-descriptor-set a matching feature-point in the database, with a descriptor-set that substantially matches said key-point's descriptor-set; and
retrieve for each retrieved matching feature point the 3D coordinates of the associated real-world 3D point.

7. The computerized system of claim 6, wherein said imaging-and-sensor-data-acquisition module comprises at least one of the following:
digital imaging device connected with a mobile devices; and
other sensors installed in said mobile device.

8. The computerized system of claim 7, wherein the processing unit further comprises:

a Self-Position-Computation software module configured for generating or receiving as input a plurality of retrieved feature points, each said feature point comprises at least the 3D coordinates of the associated real-world point, and the 2D pixel location of the associated projection of said real-world 3D point on said digital imaging device's sensor, calculating the spatial self-position and orientation of said imaging device; said self-position comprising coordinate values in a 3-dimensional real-world coordinate system, and said orientation comprising direction of optical axis, relative to a reference direction, said software module further configured to accept as input the intrinsic parameters of said digital imaging device and to use the inputs to compute the real-world position and direction-of-gaze of said digital imaging device.

9. The computerized system of claim 8, wherein said Self-Position-Computation software module is further configured to compute said spatial self-position and orientation by solving a simultaneous system of equations derived from the inputs, said component further comprising an Equation-Generation software sub-module configured to generate a simultaneous system of equations wherein the unknowns define the 3D real-world coordinates of said digital imaging device's center, and the said digital imaging device's orientation, said component further comprising a Solver software sub-module configured to solve said system of equations, and compute values of said unknowns that best satisfy said system of equations.

10. The computerized system of claim 8, wherein said Self-Position Computation software module is further configured to execute at least one of the following:
compute said 3D coordinates of said digital imaging device's center separately from computing the orientation of said digital imaging device; and
compute the position and orientation of said digital imaging device separately in a horizontal plane and in a vertical plane.

11. The computerized system of claim 8, wherein said Self-Position-Computation software module is further configured to generate and solve a simultaneous system of equations with three unknowns, wherein the solution of said system of equations defines a 2-dimensional position in either the horizontal or the vertical plane, and a single angle-of-gaze in said either horizontal or vertical plane respectively, that best satisfy said system of equations.

12. The computerized system of claim 8, wherein the processing unit further comprises at least one of the following modules:

a Region-based-Selection software module configured to select position solution candidates, said module further configured to generate a grid of positions confined to a region around a given center, said module further configured to iterate, the region used in each iteration being centered around a selected position from the region in the previous iteration;

a Planar-Angle-of-gaze software module configured to accept as first input a 2D (planar) projection of a camera position, in either a horizontal plane or a vertical plane, said module further configured to accept as second and third inputs the 2D projection coordinates onto said plane of a 3D real-world point, and the corresponding 1D pixel coordinate on said camera's sensor, said module further configured to accept as fourth input said camera's intrinsic parameters, said module further configured to compute said camera's angle-of-gaze in said horizontal or vertical plane;

a Point-pair-Planar-Line-of-sight-Difference software module, configured to accept as a first input camera intrinsic parameters, and as a second input two 1D pixel coordinates associates with a pair of point projections on said camera's sensor, in either a horizontal or a vertical plane, said module further configured to calculate the angle (D) between the two projection lines through said camera center, to the points in said pair, the module further configured to compute said angle for a plurality of point-pairs;

a Planar-Loci-Computation software module configured to compute and store the radius and centers of two circles that are collectively the locus of a given (inscribed) angle subtended by a pair of points, the module further configured to compute a plurality of loci for a plurality of pairs of points and corresponding angles;

a Circle-Intersection-Calculation software module configured to accept as input said two circles loci and compute the positions in which said two loci intersect each other, said module further configured to compute the intersection positions for a plurality of pairs of loci; and a Cluster Identification software module configured to accept as input a plurality of said intersections and identify areas of high point density, said areas of high density serving as areas for a position-candidate search.

13. The computerized system of claim 6 configured to:
receive at least one digital image of a scene from at least one digital imaging device;
retrieve data from said database;
compute geodetic information regarding points or objects in said scene; and
generate a map comprising said geodetic information.

14. The computerized system of claim 13, wherein the processing unit further comprises at least one of:
software module for obtaining 3D spatial positions of a point or an object, comprising means for generating or receiving as input at least one 2D projection of a real-world 3D point or object, and means for providing as output 3D spatial real-world coordinate values of said real-world 3D point or object;
software module for computing 3D positions of a plurality of points or objects;
software module for converting a 3D position expressed in a coordinate system collocated with an arbitrary vantage point associated with said digital image, to a given, fixed real-world coordinate system;
software module for allowing a user to select at least one object in said at least one image of a scene and for computing said geodetic information regarding said selected object;
software module for displaying said geodetic information; and
software module for generating said map comprising said geodetic information regarding a plurality of points and objects.

15. The computerized system of claim 1, wherein said Query-generation-and-search software module is connected with a plurality of mobile devices operated by said plurality of users, each of said plurality of mobile devices comprising at least one digital imaging device.

16. The computerized system of claim 15, configured to:
receive data from said plurality of digital imaging devices connected with said plurality of users' mobile devices;
retrieve data from said database; and
compute and deliver information regarding orientation, navigation and situational awareness to at least one of said plurality of mobile devices' users.

17. The computerized system of claim 16, wherein the processing unit further comprises at least one of:
software module for determining and forwarding to selected ones of said plurality of users at least one of the following:
said digital imaging device's self-position;
said digital imaging device's direction-of-gaze;
identities of said digital imaging device's objects-of-gaze, comprising objects in the digital imaging device's field of view; and
information dependent on said digital imaging device's position, direction-of-gaze and objects-of-gaze;
software module for using augmented reality to display graphical elements integrated with a captured image on said digital imaging device, said displaying comprises using virtual markers constructed form position information of said digital imaging device's objects-of-gaze and from information regarding said digital imaging device's self-position and direction-of-gaze;
software module for allowing a user of said mobile device to specify a destination to which said user desires to navigate;
software module for deriving information by which said user could navigate to, and reach a desired destination;
software module for presenting navigation information to said user;
software module for displaying the image currently taken by said digital imaging device in an Augmented Reality mode, and performing computations required for augmenting said image by overlaying graphical symbols on it;
software module for retrieving and displaying a map on said mobile device's screen, and performing the computations required for overlaying text or graphical symbols on said map;
software module for computing and presenting navigation information on a map displayed on said mobile device's screen;
software module for computing and presenting navigation information by overlaying navigation-related graphical objects on the image currently captured by the digital imaging device connected with said mobile device, and displayed on said mobile device screen; and
software module for logging and collecting information regarding self-positions, directions-of-gaze and objects-of-gaze of said digital imaging device; or user interaction with said database.

* * * * *